(No Model.)
H. HENNIG.
COFFEE OR TEA STRAINER.
No. 446,680. Patented Feb. 17, 1891.
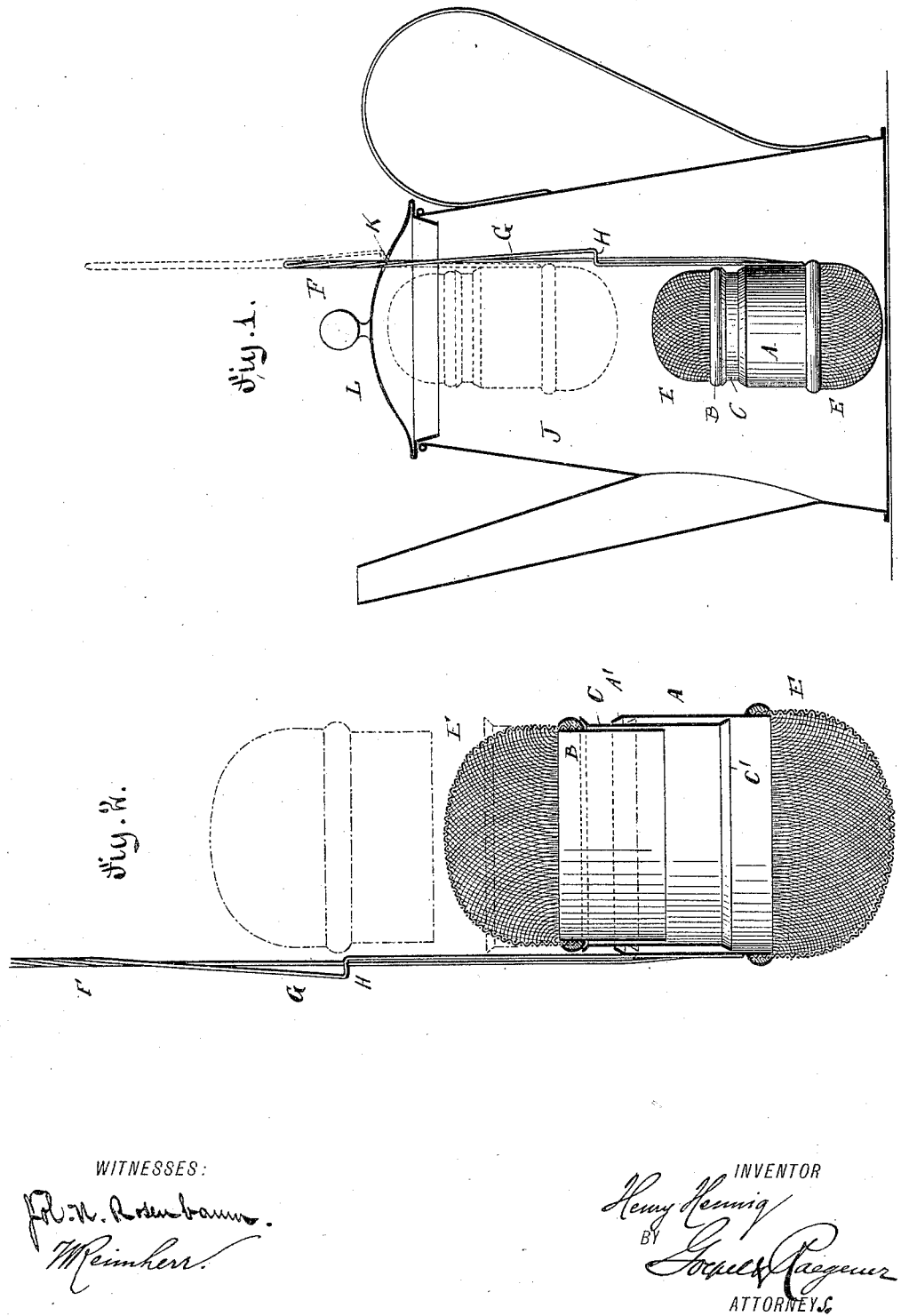
WITNESSES:
INVENTOR
Henry Hennig
BY
ATTORNEYS.

UNITED STATES PATENT OFFICE.

HENRY HENNIG, OF PATERSON, NEW JERSEY.

COFFEE OR TEA STRAINER.

SPECIFICATION forming part of Letters Patent No. 446,680, dated February 17, 1891.

Application filed September 19, 1890. Serial No. 365,492. (No model.)

*To all whom it may concern:*

Be it known that I, HENRY HENNIG, of Paterson, in the county of Passaic and State of New Jersey, a citizen of the United States, have invented certain new and useful Improvements in Coffee or Tea Strainers, of which the following is a specification.

This invention relates to improvements in that class of devices that are used for holding tea or coffee while the same is placed in boiling water for the purpose of extracting the soluble and aromatic substances in the same.

The invention consists in a coffee or tea strainer composed of a main body having a wire-netting hood or cap, a sliding or telescoping section in said main body, and a cover-section fitting in the outer end of said telescoping section, and also having a wire-netting hood or cap.

The invention also consists in the construction and combination of parts and details, which will be fully described and set forth hereinafter.

In the accompanying drawings, Figure 1 is a vertical transverse sectional view of a coffee or tea pot containing my improved strainer, and Fig. 2 is an enlarged vertical transverse sectional view of my improved strainer.

Similar letters of reference indicate corresponding parts.

My improved strainer is composed of the main section A, the cover-section B, and the intermediate telescoping section C. The outer end of the main section A and the outer end of the cover-section B are each provided with a fixed hood or cap E of wire-netting. The cover-section B fits into the upper end of the sliding or telescoping section C, which latter is adapted to slide in the main section A, thus adapting the adjustment of the strainer for a greater or less quantity of coffee or tea. The sliding section is provided at its bottom with an outwardly-inclined flange C', and the main section A is provided at its top with an inwardly-inclined flange A', which flanges A' and C' prevent the withdrawing of the sliding section C from the main section A. To the main section A the wire handle F is secured so as to project upward, which handle F is provided with a spring-arm G, having an offset or shoulder H.

The desired quantity of coffee or tea is placed into the strainer and the latter placed into the coffee-pot J, so as to rest on the bottom of the same, the upper end of the handle F being passed through an aperture K in the cover L of the pot. After a sufficient time for the extraction of all the soluble and aromatic parts of the coffee or tea contained in the strainer the handle F is pulled upward until the shoulder H arrives on the top of the cover L, when said spring-arm G snaps outward, so that said shoulder H rests upon the top of the cover, thereby holding the strainer in raised position, as shown in dotted lines in Fig. 1, and permitting the water to drop out of the strainer.

The strainer can easily be applied and removed from the coffee-pot, is entirely independent of the same, and can be applied on any pot. It is simple in construction and can easily be cleaned.

Having thus described my invention, I claim as new and desire to secure by Letters Patent—

1. A coffee or tea strainer composed of a main section having a wire-netting hood or cap, a sliding or telescoping section in the main section, and a cover-section fitting on the outer end of the sliding or telescoping section, and also having a wire hood or cap, substantially as set forth.

2. A coffee or tea strainer composed of a main section having a wire-netting hood or cap, a sliding or telescoping section in the main section, a cover-section fitting on the outer end of the sliding or telescoping section, also having a wire hood or cap, and a handle-rod secured to said strainer and provided with a spring-arm adapted to catch on the edge of an aperture in the cover of the tea or coffee pot, substantially as set forth.

In testimony that I claim the foregoing as my invention I have signed my name in presence of two subscribing witnesses.

HENRY HENNIG.

Witnesses:
 OSCAR F. GUNZ,
 W. REIMHERR.